United States Patent
Chaturvedi et al.

(10) Patent No.: US 8,560,506 B2
(45) Date of Patent: *Oct. 15, 2013

(54) AUTOMATIC SELECTION OF BLOCKING COLUMN FOR DE-DUPLICATION

(75) Inventors: Snigdha Chaturvedi, Hyattsville, MD (US); Tanveer A. Faruquie, New Delhi (IN); Hima P. Karanam, New Delhi (IN); Marvin Mendelssohn, Westborough, MA (US); Mukesh K. Mohania, New Delhi (IN); L. Venkata Subramaniam, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/447,726

(22) Filed: Apr. 16, 2012

(65) Prior Publication Data
US 2013/0151490 A1 Jun. 13, 2013

Related U.S. Application Data
(63) Continuation of application No. 13/313,518, filed on Dec. 7, 2011.

(51) Int. Cl.
*G06F 7/00* (2006.01)
(52) U.S. Cl.
USPC .......................................... 707/692
(58) Field of Classification Search
USPC ................................. 707/695, 692
See application file for complete search history.

(56) References Cited

U.S. PATENT DOCUMENTS

| | | | |
|---|---|---|---|
| 5,497,486 A | 3/1996 | Stolfo et al. | |
| 5,717,915 A | 2/1998 | Stolfo et al. | |
| 5,819,291 A | 10/1998 | Haimowitz et al. | |
| 5,960,430 A | 9/1999 | Haimowitz et al. | |
| 6,360,214 B1 * | 3/2002 | Ellis et al. | 1/1 |
| 6,381,601 B1 | 4/2002 | Fujiwara et al. | |
| 6,801,903 B2 * | 10/2004 | Brown et al. | 1/1 |
| 7,007,032 B1 * | 2/2006 | Chen et al. | 707/693 |
| 7,103,603 B2 * | 9/2006 | Yaeger | 1/1 |
| 7,152,060 B2 | 12/2006 | Borthwick et al. | |

(Continued)

FOREIGN PATENT DOCUMENTS

GB 2378789 A 2/2003

OTHER PUBLICATIONS

Christen, P., "Automatic record linkage using seeded nearest neighbour and support vector machine classification," KDD '08 Proc. 14th ACM SIGKDD Int'l. Conf. on Knowledge Discovery and Data Mining, ACM, 2008 9 pgs.

(Continued)

*Primary Examiner* — Jensen Hu
(74) *Attorney, Agent, or Firm* — Cuenot, Forsythe & Kim, LLC

(57) ABSTRACT

A method of blocking column selection can include determining a first parameter for each column set of a plurality of column sets, wherein the first parameter indicates distribution of blocks in the column set, and determining a second parameter for each column set. The second parameter can indicate block size for the column set. For each column set, a measure of blockability that is dependent upon at least the first parameter and the second parameter can be calculated using a processor. The plurality of column sets can be ranked according to the measures of blockability.

12 Claims, 3 Drawing Sheets

(56) References Cited

U.S. PATENT DOCUMENTS

| | | | |
|---|---|---|---|
| 7,899,796 | B1 | 3/2011 | Borthwick et al. |
| 2004/0172393 | A1 | 9/2004 | Kazi et al. |
| 2005/0246330 | A1 | 11/2005 | Giang et al. |
| 2009/0292704 | A1 | 11/2009 | Chen et al. |
| 2010/0005048 | A1* | 1/2010 | Bodapati et al. ............. 706/47 |

OTHER PUBLICATIONS

"Data de-duplication, data matching, data merging and purging, data list cleaning," [online] EIMS Ltd. [retrieved Jul. 22, 2011] retrieved from the Internet: <http://www.eims.biz/data-deduplication.aspx>, 2 pgs.

Christen, P., et al., "Quality and Complexity Measures for Data Linkage and Deduplication," in F. Guillet & H. Hamilton, eds, 'Quality Measures in Data Mining', Springer Studies in Computational Intelligence, vol. 43, pp. 127-151, 2007.

Goldberg, A., et al.,"The ChoiceMaker 2 Record Matching System," ChoiceMaker Technologies, Inc., Nov. 2004, 7 pgs., [retrieved Dec. 7, 2011], retrieved from the Internet: <http://www.cs.nyu.edu/cs/faculty/artg/publications/goldberg_borthwick_The_ChoiceMaker_2_Record_Matching_System_2007.pdf>.

Baxter, R., et al., "A Comparison of Fast Blocking Methods for Record Linkage," In Proc. Workshop on Data Cleaning, Record Linkage and Object Consolidation, 3 pgs., 2003.

Culotta, A., et al., "Joint deduplication of multiple record types in relational data," CIKM '05 Proc. 14th ACM Int'l. Conf. on Information and Knowledge Management, 2 pgs., 2005.

* cited by examiner

300

| Column 1 | Column 2 | Column 3 | Column 4 |
|---|---|---|---|
| ... | Delhi | 110070 | ... |
| ... | Mumbai | 400029 | ... |
| ... | Mumbai | 400029 | ... |
| ... | Mumbai | 400011 | ... |
| ... | Delhi | 110070 | ... |
| ... | Delhi | 110016 | ... |
| ... | Mumbai | 400011 | ... |
| ... | Delhi | 110070 | ... |

FIG. 3

AUTOMATIC SELECTION OF BLOCKING COLUMN FOR DE-DUPLICATION

CROSS-REFERENCE TO RELATED APPLICATIONS

This application is a Continuation of U.S. application Ser. No. 13/313,518, filed on Dec. 7, 2011, the entirety of which is incorporated herein by reference.

BACKGROUND

One or more embodiments disclosed within this specification relate to de-duplication of data within a search space.

Many organizations maintain extensive databases to track a variety of different types of data such as, for example, customer data, inventory data, or the like. Having accurate, e.g., high quality, data is often of significant importance. One aspect of maintaining quality data relates to a process referred to as de-duplication. De-duplication refers, in general, to the identification and elimination of duplicate records within a database.

De-duplication can be a complex undertaking for a variety of reasons. For example, in many cases, the sheer size of the database to undergo de-duplication means that the number of comparisons necessary to identify duplicate records can be computationally expensive or even unreasonable. In addition, many duplicate records include one or more fields that do not match exactly, making the determination of whether one record is a duplicate of another record difficult.

BRIEF SUMMARY

One or more embodiments disclosed within this specification relate to the selection of blocking columns for de-duplication of data within a search space.

An embodiment can include a method of blocking column selection. The method can include determining a first parameter for each column set of a plurality of column sets, wherein the first parameter can indicate distribution of blocks in the column set. The method can include determining a second parameter for each column set, wherein the second parameter can indicate block size for the column set. A measure of blockability can be calculated for each column set using a processor. The measure of blockability can be dependent upon the first parameter and the second parameter for the column set. The plurality of column sets can be ranked according to the measures of blockability.

Another embodiment can include a method of blocking column selection. The method can include determining a first parameter for each column set of a plurality of column sets, wherein the first parameter indicates distribution of blocks in the column set. The method also can include determining a second parameter for each column set, wherein the second parameter can indicate block size for the column set. The method further can include determining a third parameter for each column set, wherein the third parameter indicates an amount of null values within the column set, and determining a fourth parameter for each column set, wherein the fourth parameter can indicate dependence between columns of the column set. A measure of blockability can be calculated for each column set. The measure of blockability can depend upon the first parameter, the second parameter, the third parameter, and the fourth parameter.

BRIEF DESCRIPTION OF THE SEVERAL VIEWS OF THE DRAWINGS

FIG. 3 illustrates a portion of tabular data in accordance with another embodiment disclosed within this specification.

DETAILED DESCRIPTION

Figures 1, 2:
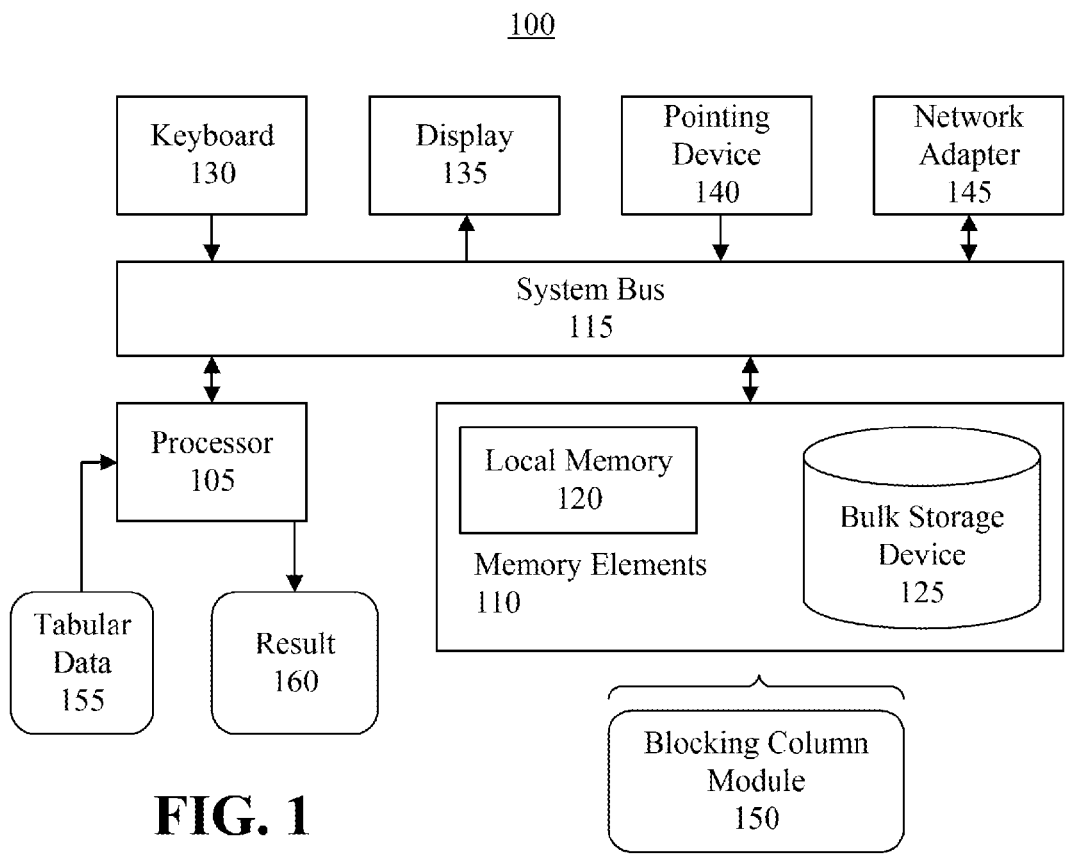
FIG. 1 is a block diagram illustrating a system for blocking column selection in accordance with an embodiment disclosed within this specification.
FIG. 2 illustrates a portion of tabular data in accordance with another embodiment disclosed within this specification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One or more embodiments disclosed within this specification relate to de-duplication of data within a search space. More particularly, one or more embodiments relate to blocking column selection for use in de-duplication of data. In accordance with the inventive arrangements disclosed herein, one or more columns, e.g., a column set, can be selected automatically for use as a blocking column or as blocking columns to limit the search space for purposes of de-duplication of data. A blocking column or columns can be used to cluster records into blocks, e.g., a reduced search space of the data set, wherein there is an increased likelihood that duplicate records are included within the blocks making de-duplication easier to perform in the reduced search space. Each of a plurality of column sets can be evaluated according to a measure of blockability that is calculated for each respective column set. The column sets that are evaluated can be ordered, e.g., ranked, according to the measures of blockability. In one aspect, each measure of blockability can depend upon one or more parameters to be described within this specification in greater detail.

FIG. 1 is a block diagram illustrating a system 100 for blocking column selection in accordance with an embodiment disclosed within this specification. System 100 can include at least one processor 105 coupled to memory elements 110 through a system bus 115. As such, system 100 can store program code within memory elements 110. Processor 105 can execute the program code accessed from memory elements 110 via system bus 115. In one aspect, for example, system 100 can be implemented as a computer that is suitable for storing and/or executing program code. It should be appreciated, however, that system 100 can be implemented in the form of any system including a processor and memory that is capable of performing the functions described within this specification.

Memory elements 110 can include one or more physical memory devices such as, for example, local memory 120 and one or more bulk storage devices 125. Local memory 120 refers to random access memory or other non-persistent memory device(s) generally used during actual execution of the program code. Bulk storage device(s) 125 can be implemented as a hard drive or other persistent data storage device. System 100 also can include one or more cache memories (not shown) that provide temporary storage of at least some program code in order to reduce the number of times program code must be retrieved from bulk storage device 125 during execution.

Input/output (I/O) devices such as a keyboard 130, a display 135, and a pointing device (not shown) optionally can be coupled to system 100. The I/O devices can be coupled to system 100 either directly or through intervening I/O controllers. Network adapters such as network adapter 145 also can be coupled to system 100 to enable system 100 to become coupled to other systems, computer systems, remote printers, and/or remote storage devices through intervening private or public networks. Modems, cable modems, and Ethernet cards are examples of different types of network adapter 145 that can be used with system 100.

As pictured in FIG. 1, memory elements 110 can store a blocking column module 150. Blocking column module 150, being implemented in the form of executable program code, can be executed by system 100. In general, blocking column module 150 can be configured to process tabular data 155 that can be received as input and evaluate tabular data 155 to identify one or more blocking columns as the result 160 that can be used for purposes of de-duplicating data, i.e., de-duplicating tabular data 155.

In illustration, system 100 can evaluate each of a plurality of column sets from tabular data 155. A "column set," as used herein, can refer to a group of one or more columns that can be used as a blocking column or as blocking columns. For each column set, a measure of blockability can be calculated. The plurality of column sets can be ranked according to the measure of blockability for each respective column set. The column set having the highest measure of blockability can be considered to be the most desirable or useful column set for use as a blocking column or columns for de-duplicating data.

For example, result 160, which can be output from system 100, can be specified in the form of a list of column sets that is ordered or ranked according to the measures of blockability. As used herein, "outputting" and/or "output" can mean storing in memory elements 110, for example, writing to a file stored in memory elements 110, writing to display 135 or other peripheral output device, playing audible notifications, sending or transmitting to another system, exporting, or the like.

The one or more embodiments disclosed within this specification can be applied to databases for eliminating duplicate records. It should be appreciated, however, that the one or more embodiments disclosed within this specification can be applied to any of a variety of forms of tabular data that include columns of fields. As such, reference to a database within this specification is intended for illustrative purposes only and is not intended as a limitation of the one or more embodiments disclosed herein.

FIG. 2 illustrates a portion of tabular data 200 in accordance with another embodiment disclosed within this specification. Tabular data 200 can represent a table that can be part of a larger data set or a database, for example. Tabular data 200 can be provided to, and processed by, a system such as the system illustrated in FIG. 1. For purposes of illustration, each row of tabular data 200 can be referred to as a "record." Accordingly, tabular data 200 includes records 1-8. It should be appreciated, however, that the terms "row" and "record" may be used interchangeably within this specification from time to time.

In general, a "block," as applied to tabular data 200, can refer to a number of fields within a column set that have a same value. FIG. 2 illustrates an example in which the column set includes a single column, i.e., column 2. Consider the case in which tabular data 200 includes address information for customers. In this example, the column set including only column 2 includes three (3) different values. The values are "Delhi," "Mumbai," and "Kolkata." Thus, column 2 includes three (3) blocks. The number of blocks in a given column "C" is effectively the number of unique values in column C.

The size of a block "B" can be defined as the fraction of records that have a value in column C that is the same as that of block B. Accordingly, the block corresponding to the value "Delhi" has a size of 4/8 since there are four fields with the value of "Delhi" in column 2. The block corresponding to the value of "Mumbai" has a size of 3/8. The block corresponding to the value of "Kolkata" has a size of 1/8.

FIG. 3 illustrates a portion of tabular data 300 in accordance with another embodiment disclosed within this specification. Tabular data 300 can represent a table that can be part of a larger data set or a database. Tabular data 300 can be provided to, and processed by, a system such as the system illustrated in FIG. 1. Tabular data 300 includes records 1-8.

FIG. 3 illustrates a "block" as applied to tabular data 300 and, more particularly, illustrates a block when the column set includes more than one column. In the example of FIG. 3, the column set can be formed of columns 2 and 3. Accordingly, unique values for the column set can refer to values in a same record joined by the "AND" operator. The number of blocks is the number of the unique combinations of values joined by the AND operator. Thus, referring to the column set including columns 2 and 3, there are a total of four (4) blocks. The blocks are as follows: "Delhi AND 110070," "Mumbai AND 400029," "Mumbai AND 400011," and "Delhi AND 110016."

The size of a block "B," again, can be defined as the fraction of records of the columns C of a column set that have the same values as determined using the AND operator that are the same as that of block B. Accordingly, the block corresponding to the values "Delhi AND 110070" has a size of 3/8. The block corresponding to the values "Mumbai AND 400029" has a size of 2/8. The block corresponding to the values "Mumbai AND 400011" has a size of 2/8. The block corresponding to the values "Delhi AND 110016" has a size of 1/8.

Figure 4:
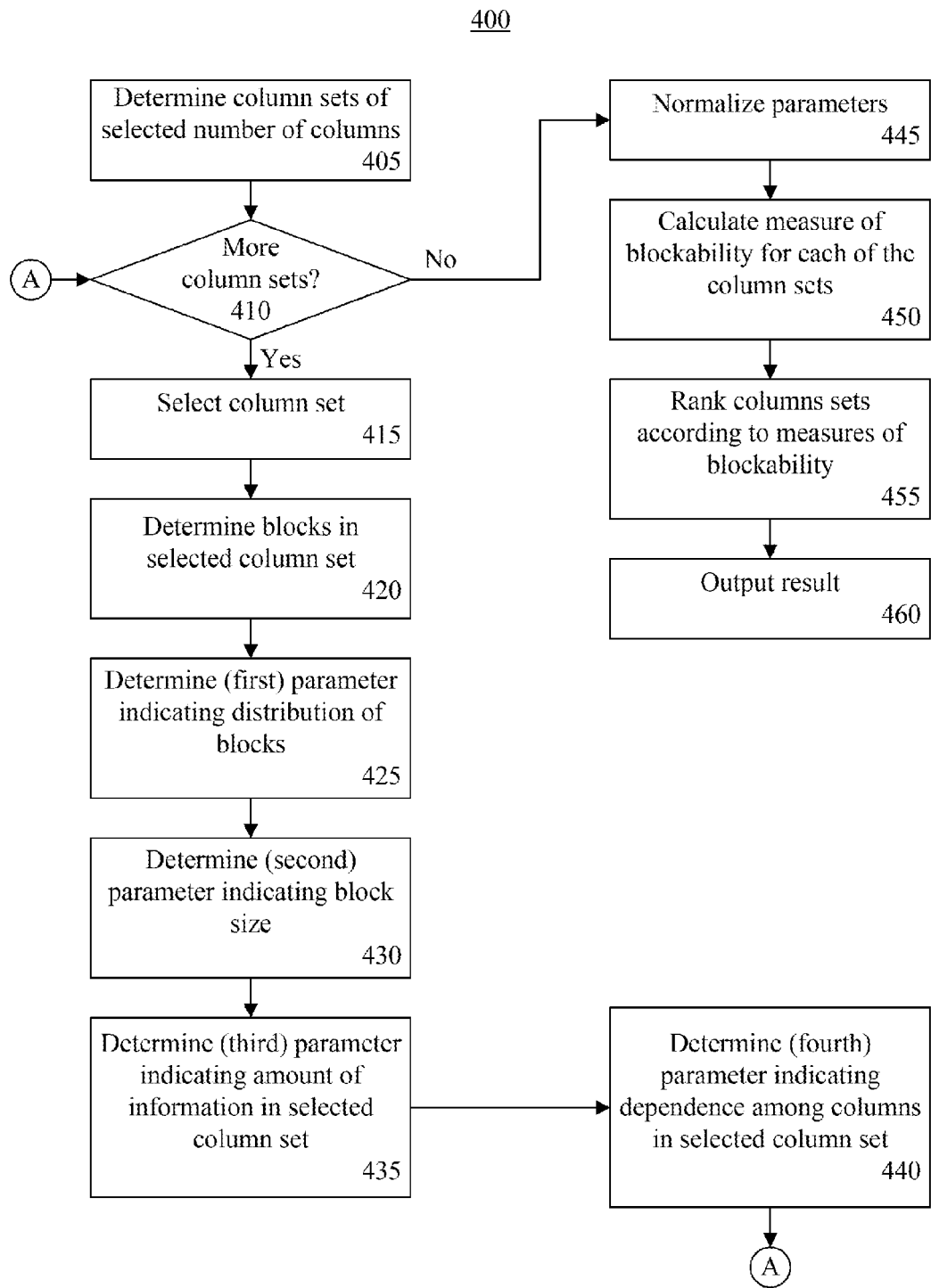
FIG. 4 is a flow chart illustrating a method of blocking column selection in accordance with another embodiment disclosed within this specification.

FIG. 4 is a flow chart illustrating a method 400 of blocking column selection in accordance with another embodiment disclosed within this specification. Method 400 illustrates an example of determining measures of blockability for a plurality of column sets as performed by a system such as system 100 of FIG. 1. As discussed, the column sets can include one or more columns. For example, in performing method 400, a particular number of columns for each column set can be set. A user input can be received or another system preference can be set, for example, that specifies the number of columns within a column set.

As such, in step 405, the system can determine column sets with each column set formed of the selected number of columns, e.g., the number of columns specified. In step 410, the system can determine whether there are any column sets of those formed in step 405 that have not yet been processed. When one or more column sets remain to be processed, method 400 can proceed to step 415. When no further column sets remain to be processed, method 400 can continue to step 445. In step 415, the system can select a column set for processing from the column sets that have not yet been processed.

In step 420, the system can determine or identify the blocks within the selected column set. In step 425, the system can determine a first parameter for the selected column set. The first parameter can indicate the distribution of blocks within the selected column set. In one aspect, the distribution of blocks can be indicated by a measure of entropy in the column set. For purposes of illustration, the measure of distribution of the blocks in the selected column set can be represented as $S_{uniformity}$. The measure of entropy can be calculated according to equation 1.

$$S_{uniformity} = \Sigma_i p_i \ln p_i \quad (1)$$

Within equation 1, $p_i$ represents a block size of the $i^{th}$ block. In the case of a column set that includes more than one column, the first parameter can be a measure of joint entropy. In selecting a blocking column, a column set having a higher value than another column set for the first parameter is a more desirable column set for use as a blocking column(s).

As an illustration, consider the case in which a table has 100 records with the selected column set having a single column. The column set can have two blocks corresponding to two unique values. If there are 98 occurrences of the first value and two occurrences of the second value, the column set can be considered to have poor distribution that will manifest itself with a low $S_{uniformity}$. By comparison, if there are 49 occurrences of the first value and 51 occurrences of the second value, such a column will have a better distribution that manifests itself as a higher value of $S_{uniformity}$.

In step 430, the system can determine a second parameter for the selected column set. The second parameter can indicate block size in the selected column set. Block size can be indicated in any of a variety of ways. In one aspect, block size can be indicated or determined using an averaging technique. For purposes of illustration, the measure of block size in the selected column can be represented as $S_{BlockSize}$. The measure of block size can be calculated according to equation 2.

$$S_{BlockSize} = -\ln x \quad (2)$$

Within equation 2, x can represent the average block size in the selected column set. In one aspect, when selecting a column set that is desirable as a blocking column, the average block size will be neither too high nor too low. For example, the average block size can be within a specified range determined to be desirable for block size. Accordingly, in calculating equation 2, the average block size first must be calculated. A column set that is desirable for use as a blocking column(s) will have a value of $S_{BlockSize}$ that is high.

In illustration, consider a case in which a first column set has two blocks and each block has a size of 50/100. A second column set can have 100 blocks, with each block having a size of 1/100. In this example, the first column set and the second column set is each equally distributed. The second column set, however, is not desirable as a blocking column. The second parameter for the second column is lower than the second parameter for the first column, thereby indicating that the first column is a more desirable choice as a blocking column. The second parameter, in effect, weights, e.g., favors, those columns that are determined to be neither too large nor too small as discussed.

In step 435, the system can determine a third parameter for the selected column set. The third parameter can indicate the amount of information that is in the selected column set. One way of quantifying the amount of information that is in the selected column set can utilize an inverse approach in which the amount of information that is missing from the selected column set is quantified. For example, in one aspect, the amount of information that is in the selected column set can be determined by quantifying the amount or number of null values, i.e., fields that include no value or a null value, in the selected column set. The number of null fields, for example, can be offset against the total number of records in the tabular data. For purposes of illustration, the amount of information that is in the selected column set can be represented by $S_{Null}$. In another aspect, $S_{Null}$ can be calculated for a selected column set according to equation 3.

$$S_{Null} = e^f \quad (3)$$

In equation 3, f can represent the fraction of records in the selected column set that include null values. For example, for the selected column set, if 10 records of 100 have null values, the value of f can be set to 0.1. In general, the value for $S_{Null}$ is less sensitive when the column set includes fewer nulls, but becomes more sensitive, e.g., grows, responsive to column sets with more nulls. When the selected column set includes multiple columns, a null value in the field of any of the columns can be considered a null value for that record in terms of calculating the value of f for determining $S_{Null}$. A column set that has a value of $S_{Null}$ that is low is a desirable column for use as a blocking column(s).

In step 440, the system can determine a fourth parameter for the selected column set. The fourth parameter can indicate the amount of dependence between the columns in the selected column set as represented by $S_{Dependence}$. One way of quantifying the amount of dependence between columns in the selected column set can rely upon the mutual information between the columns and the joint entropy of the columns. In one aspect, $S_{Dependence}$ can be calculated according to equation 4.

$$S_{Dependence} = \frac{\text{Mutual information between columns of selected column set}}{\text{Joint Entropy of the columns of the selected column set}} \quad (4)$$

From equation 4, the value of $S_{Dependence}$ is generally as follows: $0 \leq S_{Dependence} \leq 1$. In selecting a column set that is a desirable candidate for serving as a blocking column, a value of $S_{Dependence}$ that is low is more desirable. It should be appreciated that in cases where the selected column set includes only one column, the value of $S_{Dependence}$ can be set equal to zero (0), e.g., a default value and also a value indicating low dependence as only one column is in the selected column set.

After determining the parameters described, method 400 can loop back to step 410 to select further column sets for processing until such time that no further column sets remain to be processed. After the column sets determined in step 405 have been processed, method 400 can continue to step 445.

In step 445, the system can normalize the parameters. In general, each parameter, with the exception of the measure of independence, i.e., the fourth parameter, for each of the column sets processed can be normalized by dividing the parameter by the sum of all like parameters for the column sets processed. For example, in normalizing the first parameter represented as M, a normalized version of M denoted as Norm(M) can be calculated or determined according to equation 5.

$$Norm(M) = \frac{M}{\text{Sum of } M \text{ values for all column sets}} \quad (5)$$

The process described in step 445 can be applied to generate a normalized version of each of the first, second, and third parameters for each of the column sets that were processed. Appreciably, the fourth parameter is already a normalized value and need not be normalized in step 445.

In step 450, the system can calculate a measure of blockability for each of the column sets processed. In one aspect, the measure of blockability can be calculated according to equation 6.

$$Blockability = \frac{\text{Normalized } S_{Uniformity} + \text{Normalized } S_{BlockSize}}{\text{Normalized } S_{Null} + S_{Dependence}} \quad (5)$$

In step 455, the system can sort the column sets according to the measures of blockability. For example, the system can sort the column sets according to decreasing values of blockability. In step 460, the system can output the results, which, as noted, can include the sorted list of column sets. In one aspect, the results, e.g., the list, can specify one or more or all of the parameters for each column set, the measure of blockability for each column set, or any combination thereof. In another aspect, one or more of the results can be output in the form of a graph. For example, a graph of block size vs. blocks can be output. Virtually any of the quantities described within this specification can be output in graph form if so desired.

The sorted list of column sets allows a user to select a column set from the list for use as a blocking column. While the system outputs a preferred choice in the form of the column set that has the highest blockability which is the first or highest ranked column set, the user is free to choose another column set as may be desired.

Method 400 is described in terms of processing column sets of a given number of columns. In another aspect, the system can be instructed to process column sets that include 1, 2, 3, ..., up to "N" columns. For example, the system can be instructed to form column sets that include one column, two columns, or more columns up to some integer number of columns "N." The value of N can be set as a system preference by default or can be provided or specified through a user input.

In that case, the system can continue to form column sets and process each column set as described with reference to FIG. 4 regardless of the fact that the column sets being evaluated have different numbers of columns therein. The measure of blockability that is calculated for each column set still can be used to sort the list of column sets in a list of column sets that is output despite the differing number of columns in the column sets on the list. The measure of blockability described is independent of the number of columns used in the column sets, thereby allowing the list of column sets to include column sets of differing column numbers but still convey a meaningful result in terms of ranking.

The one or more embodiments disclosed within this specification allow column sets to be evaluated for use as blocking column(s) for purposes of de-duplication. It should be appreciated that while the four parameters are utilized for purposes of determining the measure of blockability, other combinations and/or sub-combinations also can be used to determine a measure of blockability.

For example, in one aspect, the first parameter, or a normalized version thereof, can be used as a measure of blockability. In another aspect, the first and the second parameters can be used to formulate a measure of blockability, e.g., where the two parameters or normalized versions of the two parameters are summed. In still another aspect, the first, second, and third parameters can be used to determine a measure of blockability. For example, the first and second parameters, or normalized versions thereof, can be summed and divided by the third parameter, or a normalized version of the third parameter.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

For purposes of explanation, specific nomenclature is set forth to provide a thorough understanding of the various inventive concepts disclosed herein. The terminology used herein, however, is for the purpose of describing particular embodiments only and is not intended to be limiting. As used herein, the singular forms "a", "an" and "the" are intended to include the plural forms as well, unless the context clearly indicates otherwise. As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that the term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

It should be appreciated that all of these and similar terms are to be associated with the appropriate physical quantities and are merely convenient labels applied to these quantities. Unless specifically stated otherwise as apparent from the following description, it should be appreciated that throughout the description, statements utilizing terms such as "processing" or "computing" or "calculating" or "determining" or "displaying" or the like, refer to the action and processes of a data processing system, e.g., a computer system, or similar electronic computing device, that manipulates and transforms data represented as physical (electronic) quantities within the computer system's registers and/or memories into other data similarly represented as physical quantities within the computer system memories and/or registers or other such information storage, transmission or display devices.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method of blocking column selection, the method comprising:
    determining a first parameter for each column set of a plurality of column sets, wherein the first parameter indicates distribution of blocks in the column set;
    determining a second parameter for each column set, wherein the second parameter depends upon block size for the column set;
    for each column set, calculating a measure of blockability that is dependent upon at least the first parameter and the second parameter for the column set using a processor; and
    ranking each column set according to the measures of blockability.

2. The method of claim 1, wherein the first parameter is a measure of entropy.

3. The method of claim 1, wherein the second parameter depends upon an average block size.

4. The method of claim 3, wherein the second parameter is an inverse log of the average block size.

5. The method of claim 1, further comprising:
determining a third parameter for each column set, wherein the third parameter indicates an amount of null values in the column set, and wherein the third parameter is used in calculating the measure of blockability for the column set.

6. The method of claim 5, wherein, for each column set, calculating a measure of blockability that is dependent upon at least the first parameter and the second parameter for the column set using a processor comprises:
determining a normalized version of each of the first parameter, the second parameter, and the third parameter; and
calculating a sum of the normalized first parameter and the normalized second parameter and dividing the sum by the normalized third parameter.

7. The method of claim 1, wherein each column set comprises at least two columns, the method further comprising:
determining a third parameter for each column set, wherein the third parameter indicates dependence between columns of the column set, and wherein the third parameter is used in calculating the measure of blockability for the column set.

8. The method of claim 5, wherein each column set comprises at least two columns, the method further comprising:
determining a fourth parameter for each column set, wherein the fourth parameter indicates dependence between columns of the column set, and wherein the fourth parameter is used in calculating the measure of blockability for the column set.

9. The method of claim 8, wherein, for each column set, calculating a measure of blockability that is dependent upon at least the first parameter and the second parameter for the column set using a processor comprises:
determining a normalized version of each of the first parameter, the second parameter, and the third parameter; and
calculating a first sum of the normalized first parameter and the normalized second parameters, calculating a second sum of the normalized third parameter and the fourth parameter, and dividing the first sum by the second sum.

10. A method of blocking column selection, the method comprising:
determining a first parameter for each column set of a plurality of column sets, wherein the first parameter indicates distribution of blocks in the column set;
determining a second parameter for each column set, wherein the second parameter depends upon block size for the column set;
determining a third parameter for each column set, wherein the third parameter indicates an amount of null values in the column set;
determining a fourth parameter for each column set, wherein the fourth parameter indicates dependence between columns of the column set; and
for each column set, calculating a measure of blockability that depends upon the first parameter, the second parameter, the third parameter, and the fourth parameter.

11. The method of claim 10, further comprising:
ranking each column set according to the measures of blockability.

12. The method of claim 10, wherein, for each column set, calculating a measure of blockability that depends upon the first parameter, the second parameter, the third parameter, and the fourth parameter further comprises:
determining a normalized version of each of the first parameter, the second parameter, and the third parameter; and
calculating a first sum of the normalized first parameter and the normalized second parameter, calculating a second sum of the normalized third parameter and the fourth parameter, and dividing the first sum by the second sum.

* * * * *